April 19, 1949.                C. A. PERSONS                2,467,632
                     SPRING SUPPORTING CONSTRUCTION FOR
                              CYCLE SADDLE SEATS
                            Filed Nov. 29, 1947
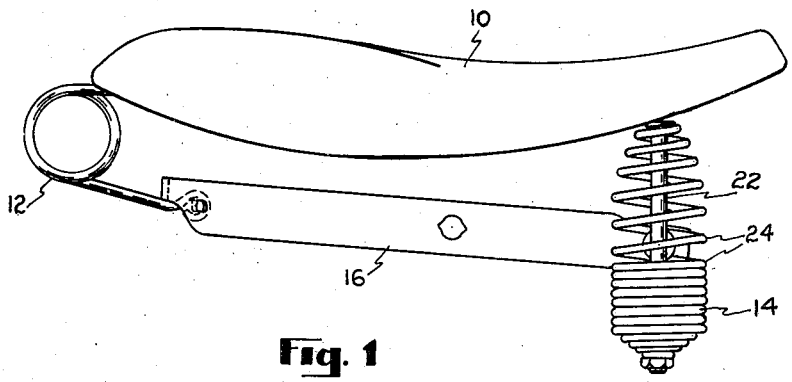
Fig. 1
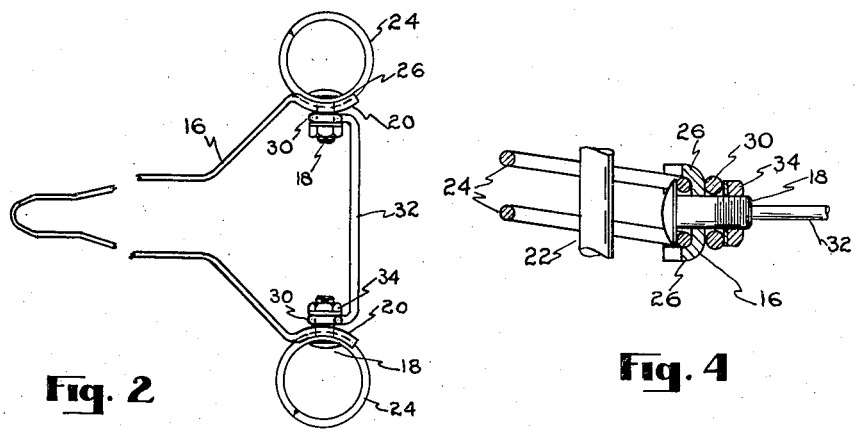
Fig. 2                              Fig. 4
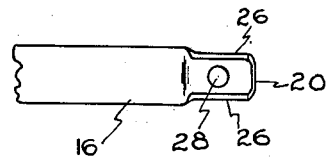
Fig. 3
INVENTOR.
Charles A. Persons
BY
Charles R. Fay, atty.

Patented Apr. 19, 1949                                                                2,467,632

UNITED STATES PATENT OFFICE 2,467,632

SPRING SUPPORTING CONSTRUCTION FOR CYCLE SADDLE SEATS

Charles A. Persons, Worcester, Mass.

Application November 29, 1947, Serial No. 788,907

3 Claims. (Cl. 155—5.21)

This invention relates to saddles for bicycles, tricycles, motorcycles and other wheeled vehicles, which for convenience in further references will be simply referred to as saddles.

The principal object of the invention resides in the provision of a saddle of the spring type having a degree of simplicity, ease of assembly, permanence of construction, and economy of manufacture beyond any device of this sort previously known.

A commonly accepted method of springing a saddle top comprises springs at the front and rear of the saddle seat, these springs being attached to a longitudinal truss, or supporting frame. This frame includes a means for attaching the saddle to the seat post of the cycle.

The rear springs in this type of saddle may be simple compression springs, or a combination spring containing both open coils for compression and closed coils for extension. When using the combination springs, for mechanical soundness and durability, it is necessary to connect the vertical springs by at least two of their coils to the frame, this requiring a bolt with a special head, which is expensive to manufacture.

With the foregoing in view, a further object of this invention is to provide a novel connection between the springs and the frame that will eliminate the use of such a costly bolt. In order to do this, a flat steel truss frame is used and the rearmost portions of the truss are formed into arcs, the inside radius of which correspond to the outside radius of the vertical springs. The upper and lower edges of the arced portions are flanged, whereby the ends of the truss will partly encircle and straddle at least two of the coils of the springs; and through a prepared hole in the truss frame, the latter and the springs are permanently locked together by means of a nut and bolt.

Other objects and advantages of the invention will appear hereinafter.

Reference is to be had to the accompanying drawings in which

Fig. 1 is a view in side elevation of a cycle saddle incorporating the invention;

Fig. 2 is a plan view of the improved frame, showing the relation thereof to the saddle springs;

Fig. 3 is a side view of the frame; and

Fig. 4 is an enlarged section through the connection between the vertical spring and the frame.

The saddle top 10, which may be of any suitable construction or materials, is mounted on a spring set which consists of a front spring 12, which is usually a nose coil, a pair of compression-extension coil springs 14 suspended from the rear of the saddle top, and a substantially Y-shaped longitudinal flat steel truss, or a supporting frame 16, which extends from the front spring 12, to the rear springs 14 and which is attached to these springs by bolts 18, as shown in Fig. 4. The truss frame is provided with two rear end portions 20, clearly shown in Fig. 2.

The compression-extension springs 14 are provided with the usual posts or vertical rods 22, and just above the closely coiled extension portion of the springs, the wire is coiled in open manner as at 24 providing the compression portion. Advantage is taken of these open coils in carrying out the present invention.

The rear end portions 20 of the truss frame are formed on arcs of circles so that the outwardly facing concave surfaces of the portions 20 correspond to the exterior arc of radius of the springs. The curved end portions are wider than the distance between the compression coils 24 and are flanged over at top and bottom as at 26, to closely engage and hold the coils 24, see Fig. 4. Thus two or more coils 24 are straddled and partly encircled by the formed frame ends 20.

The bolt 18 is thrust through a hole 28 in the frame end 20, the head of the bolt engaging the coils 24 from the inside of the coiled spring. The bolt passes through an eye 30 at the end of cross brace rod 32, so that the two frame ends 20 are connected, and a nut 34 is used to complete the assembly as will be clear, the nut and bolt being stock types.

It will be seen that this invention carries out the objects stated and that a better saddle more inexpensively made is produced.

Having thus described my invention and the advantages thereof, I do not wish to be limited to the details herein disclosed otherwise than as set forth in the claims, but what I claim is:

1. In a device of the class described, a saddle seat, a front nose spring, two vertical rear springs, a horizontal supporting frame, formed portions at the rear end of the said frame, said formed portions each being on an arc the inside radius of which corresponds to the outside radius of said vertical rear springs, flanges on the upper and lower edges of the formed portions of said frame, said flanges being directed towards the rear springs, and means securing the rear springs to the formed portions of the frame.

2. In a saddle of the class described, a horizontal elongated frame, a saddle top, a rear combination compression-extension spring attached to said saddle top, means for attaching the spring to the frame, said means comprising a plain headed bolt, and a formed portion on the frame, said bolt passing between two coils of said spring, and through a hole in said formed portion of the frame, a nut on the bolt fastening said spring to said frame, said formed portion being comprised of an arc formed in one end of said frame, the inside radius of said arc being the same as the outside radius of the rear spring, the edges of said frame at the arc being flanged inward towards the center of the radius, said arc and flanges holding and restricting said rear spring.

3. A saddle comprising a seat, a front nose spring, a Y-shaped, horizontal truss frame, and a pair of vertical rear coil springs, the truss frame being connected to the front spring at the leg of the Y and each arm of the latter being adapted to be connected to one rear coil spring, and means to connect the truss frame to the rear coil springs comprising an arced flanged end portion for each said arm, the arcs closely engaging the exterior of at least two separated coils of the rear springs and the flanges containing the two said coils, and a bolt passing between the two coils and through the arced end frame portions, the head of the bolt engaging the two coils at the interior of the rear springs.

CHARLES A. PERSONS.

REFERENCES CITED

The following references are of record in the file of this patent:

UNITED STATES PATENTS

| Number | Name | Date |
| --- | --- | --- |
| 1,087,393 | Olds | Feb. 17, 1914 |
| 1,186,603 | Persons | June 13, 1916 |
| 1,188,481 | Persons | June 27, 1916 |
| 2,347,093 | Faulhaber | Apr. 18, 1944 |